C. J. WOODHOUSE.
ICE WEIGHING ATTACHMENT FOR ICE BOXES.
APPLICATION FILED JULY 1, 1913.

1,097,497.

Patented May 19, 1914.

2 SHEETS—SHEET 1.

Witnesses
Gerald Henry
C. C. Hines

Inventor
C. J. Woodhouse
By Victor J. Evans
Attorney

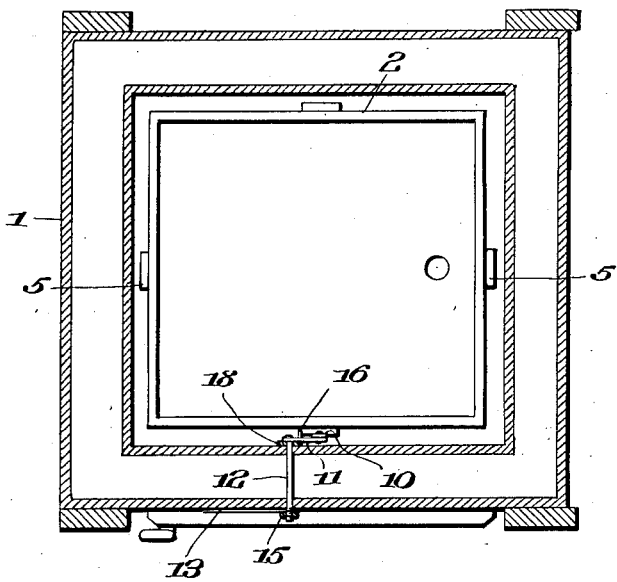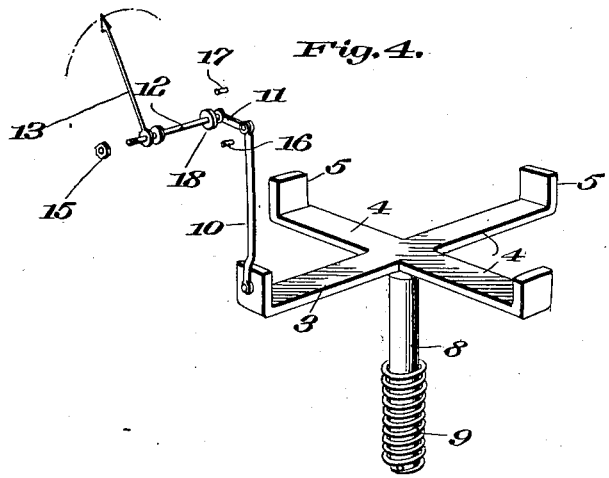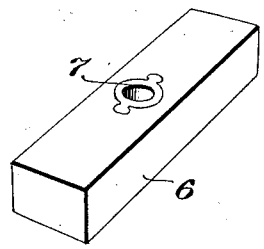

UNITED STATES PATENT OFFICE.

CHARLIE JOSEPH WOODHOUSE, OF SOUTH MANCHESTER, CONNECTICUT.

ICE-WEIGHING ATTACHMENT FOR ICE-BOXES.

1,097,497.  Specification of Letters Patent.  Patented May 19, 1914.

Application filed July 1, 1913. Serial No. 776,854.

*To all whom it may concern:*

Be it known that I, CHARLIE J. WOODHOUSE, a citizen of the United States, residing at South Manchester, in the county of Hartford and State of Connecticut, have invented new and useful Improvements in Ice-Weighing Attachments for Ice-Boxes, of which the following is a specification.

This invention relates to an ice weighing attachment or scale for ice boxes, the object of the invention being to provide a simple, reliable and efficient device of this character so that the amount of ice contained in the ice box may at all times be determined, and the weight of a piece of ice placed in the box readily calculated.

A further object of the invention is to provide a weighing device which will removably support the ice tank or receptacle allowing the latter to be taken out and cleansed whenever required, which embodies a weighing mechanism composed of few parts not liable to easily get out of order, but which may be readily removed and replaced when required, and which permits of the ready drainage of the ice water from the tank or receptacle.

Figure 1:
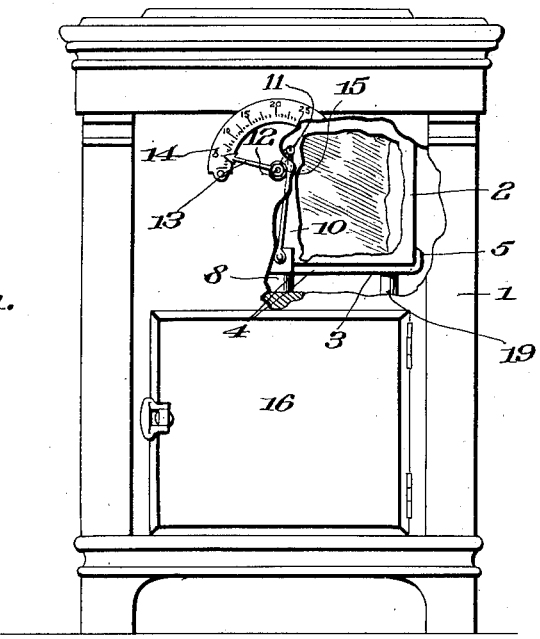
Figure 2:
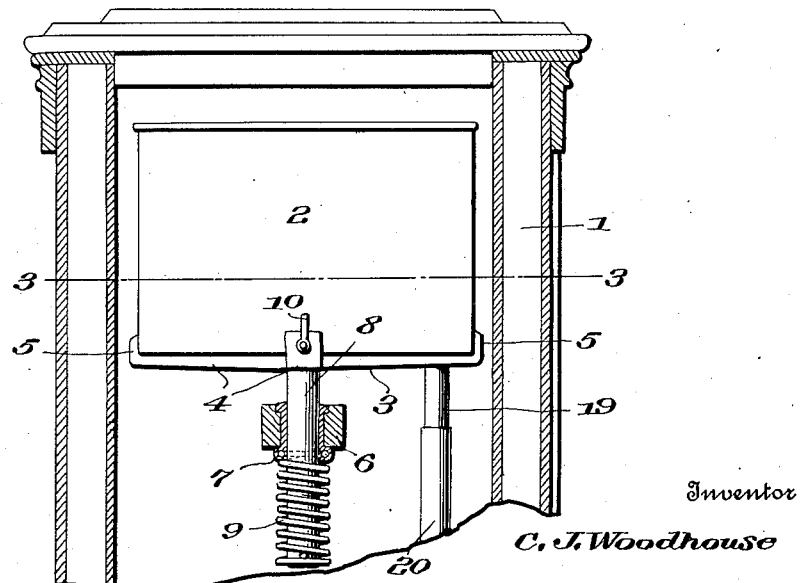

The invention consists of the novel features of construction, combination and arrangement of parts, hereinafter fully described and claimed, reference being had to the drawings, in which:

Figure 1 is a front elevation, partly in section, of an ice box equipped with my invention, Fig. 2 is a vertical transverse section thereof. Fig. 3 is a horizontal section on line 3—3 of Fig. 2. Fig. 4 is a perspective view of the parts of the weighing mechanism *per se*. Fig. 5 is a similar view of the platform.

Referring to the drawings, 1 designates an ice compartment or chamber of an ice box or refrigerator, adapted to receive an ice holding tank 2. This tank 2 is supported by a vertical movable frame 3 forming a part of my improved weighing mechanism. As shown, the said frame 3 is of cruciform shape, having arms 4 radiating from a common center and terminating at their outer ends upwardly bent retaining flanges or members 5 adapted to engage the walls of the tank 2 and retain the same in position against shifting movement.

The frame 3 is mounted upon a platform or support 6, preferably comprising a wooden bar or block, which extends between and is fixed to the front and rear walls of the compartment 1. The frame and platform are so constructed as to allow free circulation of the air throughout the compartment 1 and about the walls of the tank, for a proper cooling of the contained air. The platform 6 is provided with a guide tube 7 extending vertically therethrough and suitably attached at its upper end to the platform through this tube extends a rod or stem 8 depending from the center of the frame 4. A coiled spring 9 incloses the lower end of this rod and is fastened at its lower end to the lower end of the rod and at its upper end to the lower end of the guide tube, said spring serving as the resistance device opposing a determined resistance to the downward movement of the frame 4 from a normal position under the weight of the ice contained in the tank 2.

Pivotally connected with one of the portions 5 of the frame is a rod 10 which couples the frame to the crank arm 11 of a rock shaft 12. This shaft is journaled in one of the walls of the compartment 1 and extends to the exterior where it is provided with an indicating hand or pointer 13 adapted to traverse an indicator scale 14 secured with the exterior of the ice box or refrigerator body. It will thus be understood that when the tank is empty, the spring will sustain the frame and tank at the limit of their upward movement, and the pointer or hand 13 will occupy its zero position. When, however, a piece of ice is placed in the tank, the latter will be displaced to a greater or less degree dependent upon the weight of the ice, thereby actuating the hand or pointer to indicate the weight on the exterior of the ice box or refrigerator. By this means the user of the refrigerator may at all times ascertain the amount of the ice contained in the refrigerator, as well as the exact weight of a piece of ice placed, at any time in the ice tank, thus diminishing liability of householders overlooking the need of ice, and also preventing the householder from being defrauded when purchasing a piece of ice.

Preferably, the indicator hand or pointer 13 is secured in position by means of a retaining nut 15 so that it may be adjusted on the crank shaft to enable the weighing mechanism to be regulated when occasion requires. Stop pins 16 and 17 are also preferably provided to limit the swinging motion of the crank 11 and adapted to turn always in the right direction. A washer 18 or its equivalent may be employed to hold the crank shaft from longitudinal movement. The tank is provided with a waste outlet tube 19 which is telescopically movable in the upper end of the water discharge pipe 20 of the refrigerator.

From the foregoing description taken in connection with the accompanying drawing, the construction and mode of use of my improved ice weighing attachment for ice boxes and refrigerators will be readily understood and it will be seen that a device of this character is provided which is simple of construction, efficient in operation, capable of being readily cleansed and adapted for use upon any ordinary ice box or refrigerator.

Having thus described my invention, I claim:

In an ice weighing attachment for refrigerators and the like, the combination of a refrigerator having an ice chamber, a frame movably mounted in said chamber and having upstanding projections, an ice tank adapted to rest upon said frame and to be held by said projections, a rod depending from the frame, a support having a guide tube through which the rod extends, a balancing spring connecting the rod and tube, a scale, a crank for actuating a pointer co-acting with the scale, and a connecting link between the crank and one of said upstanding frame projections.

In testimony whereof I affix my signature in presence of two witnesses.

CHARLIE JOSEPH WOODHOUSE.

Witnesses:
Wm. F. Barrett,
James H. Woodhouse.